United States Patent [19]
Brunsell et al.

[11] Patent Number: 4,975,188
[45] Date of Patent: Dec. 4, 1990

[54] CENTRIFUGAL FILTER APPARATUS

[76] Inventors: Dennis A. Brunsell, 705 Main St., Arlington, Wis. 53911; John M. Ehle, 5006 Voges Rd., Madison, Wis. 53704

[21] Appl. No.: 303,534

[22] Filed: Jan. 27, 1989

[51] Int. Cl.$^5$ .............................................. B01D 33/15
[52] U.S. Cl. ................................... 210/324; 55/204; 55/459.1; 210/333.1; 210/360.1; 210/331
[58] Field of Search ............... 55/459.1, 204; 209/144, 209/211, 324, 331, 333.1, 360.1, 360.2, 380.1

[56] References Cited

U.S. PATENT DOCUMENTS

| | | | |
|---|---|---|---|
| 2,913,068 | 11/1959 | Mistorz et al. | 55/204 X |
| 3,204,772 | 9/1965 | Ruxton | 55/204 X |
| 3,997,447 | 12/1976 | Breton et al. | |
| 4,455,220 | 6/1984 | Parker et al. | 55/459.1 X |
| 4,698,156 | 10/1987 | Bumpers. | |
| 4,717,485 | 1/1988 | Brunsell et al. | |

*Primary Examiner*—Charles Hart
*Attorney, Agent, or Firm*—Lathrop & Clark

[57] ABSTRACT

A rotating filter apparatus (10) has a stack of porous filter disks (22) attached to a vertical, rotatable hollow shaft (24) and located within a chamber (32), the shaft (24) having a plurality of openings (26) therein to the hollow bore of the shaft (24). Unfiltered fluid is introduced to the chamber (32) under pressure in a tangential entry port (34) in the same direction as disk (22) rotation. Clarified fluid passes through the disks (22) to form a filtrate that flows down the shaft (24), while the unfiltered fluid and the solid particles, or sludge, descend in the chamber (32) to a tapered section (18). Non-fluid transfer and fluid transfer seal assemblies (14, 20) comprise bearings (54, 102, 108), seals, and associated parts upon which the shaft is properly aligned, balanced, and centered. The seal assemblies (14, 20) include seals positioned about the shaft (24) to form a boundary that isolates the bearings (54, 102, 108) from the unfiltered fluid or filtrate. A seal seal coolant is circulated within the non-fluid and fluid transmitting seal assemblies (14, 20) against the seals on the side of boundary opposing the unfiltered fluid, and the pressure of the coolant is maintained above that of the pressure of the fluid in the chamber (32) to prevent transfer of unfiltered fluid across the seal faces at any time. The drive shaft (24) has a coupling (190) which has a male (192) and female (194) interlock for ease of assembly. The tapered section (18) incorporates baffles (196, 198, 199) which promote settling of the sludge in the tapered section (18).

22 Claims, 10 Drawing Sheets

CENTRIFUGAL FILTER APPARATUS

FIELD OF THE INVENTION

The present invention relates generally to filter apparatuses and more particularly to rotating filter apparatuses for separating fine particulates of solid from liquids and dispersed immiscible phases from each other.

BACKGROUND OF THE INVENTION

Centrifugal disk filters typically use rapidly rotating filter elements contained in a pressure vessel to which a suspension of solid particles in a fluid are injected to effect separation and produce two streams exiting the unit. A clarified fluid represents one stream exiting the unit and a concentrated slurry or second phase represents the other stream.

Though the centrifugal disk filter provides an improved filtration method, the centrifugal filter has suffered from operational and durability problems. Centrifugal disk equipment typically has not been operable for extended periods of time without failure of the seals and/or bearings. As is typical of rotating equipment, seals and bearing surfaces should be relatively maintenance-free in order to be commercially viable. Seals are necessary to keep the slurry within the pressure vessel and to prevent the particulate from recontaminating the filtrate. Where hazardous substances are to be filtered, containment problems are critical in that leakage to atmosphere may be harmful to operators or other people in the area of the centrifugal disk filter. The prior centrifugal disk separators incorporated no means of detecting seal failure or of preventing such a failure from contaminating the filtrate. Most seal failures occur when abrasive material in the pressurized fluid being filtered enters into the mechanical seal, causing scarring of the seal faces which, in turn, then allows leakage.

The rotating equipment of the centrifugal filters must be properly aligned, balanced, and centered to provide smooth, vibration-free operation with proper sealing. Many types of couplings have been developed for similar applications but none have been successful at power transfer, quick separation, liquid transfer within a hollow interior, and liquid-tight connections at the same time.

Prior centrifugal filters incorporated a tapered or conical section to concentrate the heavier solids. Problems resulted from the turbulence created by vortex action of the filter so that the solids tended to circulate throughout the vessel, rather than being concentrated in the tapered section. The vortex action causes the fluid to fall on the interior wall of the vortex and rise at the peripheral wall. The rising liquid carries the solids back to the top and redistributes them throughout the fluid.

SUMMARY OF THE INVENTION

In accordance with the present invention, a centrifugal filter apparatus includes a hollow, rotatable vertical shaft having a plurality of openings along the length of the shaft. A plurality of porous filter disks are mounted upon the shaft in stacked relation and separated by fluid impervious spacers. The shaft extends through a pressure vessel or chamber and is mounted for rotation at non-fluid transfer and fluid transfer seal assemblies. Unfiltered fluid is introduced under pressure into the chamber through a tangential entry port near the top of the chamber, the direction being in the same direction as the rotating direction for the disks. Speed of rotation of the disks is set at a rate sufficient to keep the faces of the disks substantially free from particle adherence buildup and provide centrifugal separation of solids in fluid. The filtered particles are repulsed by the filtering action of the disks in the fluid boundary established along their faces, the particles being circulated outwardly until they descend to the bottom of the chamber. The required rotational speed to accomplish satisfactory filtering varies with the relative specific gravity of the solid and the viscosity of the liquid being filtered.

Clarified fluid under pressure is forced through the disks to form a filtrate and the fluid phase concentrated with solid particulates are forced outward by centrifugal forces. The filtrate flows through the hollow shaft and then exits the shaft through an exit port located near the end of the shaft. The exit port is located in the fluid transfer seal assembly. The remaining unfiltered fluid and particulates circle and descend downwardly in the chamber and settle through a tapered section to form a concentrated slurry or sludge, which is removed from the apparatus.

The non-fluid transfer and fluid transfer seal assemblies comprise bearings, seals, and associated parts upon which the shaft is properly aligned, balanced, centered and concentric. The seal assemblies include seals positioned about the shaft to form a boundary that isolates the bearings from the unfiltered fluid or filtrate. A seal coolant is pumped by turbines and circulated within the non-fluid transfer and fluid transfer seal assemblies against the seals on the side of the boundary opposing the unfiltered fluid, the filtrate, or to atmosphere. The pressure of the seal coolant is maintained above that of the pressure of the fluid in the chamber to prevent transfer of unfiltered or contaminated fluids across the seal faces at any time. The unfiltered fluid is therefore kept within the chamber and particulates are prevented from recontaminating the filtrate. The seal coolant is circulated through a heat exchanger to keep the temperature of the seals significantly below the flash point temperature of the coolant in order to prevent cavitation of the turbines which would otherwise result in loss of flow of the coolant to the seals and more drastic loss of heat transfer. A feedback bias regulator applies air pressure to the coolant in the heat exchanger to maintain a pressure differential based upon the pressure in a feedback line attached to the filter chamber. The bias spring of the feedback regulator is also used to apply differential pressure to prevent the intrusion of unfiltered fluid.

The shaft has a coupling near its one end which serves to align the shaft, transmit power, seal the slurry or unfiltered fluid in the chamber from the filtrate in the hollow of the shaft, and permit easy assembly and disassembly of the shaft from the unit for replacement of the disks. The coupling of the present invention utilizes a male and female interlock. This is an advantage over the threaded connections of the prior art in that threaded connections are difficult to engage, become filled with debris, and are unwieldy.

Because the rotation of the disks creates a vortex action which tends to maintain the particulates in suspension rather than settle at the bottom of the tapered section, the present invention incorporates baffles in the tapered section of the chamber. This minimizes the vortex action to allow for better settling of the particulates to form sludge.

Further objects, features, and advantages of the invention will be apparent from the following detailed description taken in conjunction with the accompanying drawings.

DESCRIPTION OF THE PREFERRED EMBODIMENT

Figure 1:
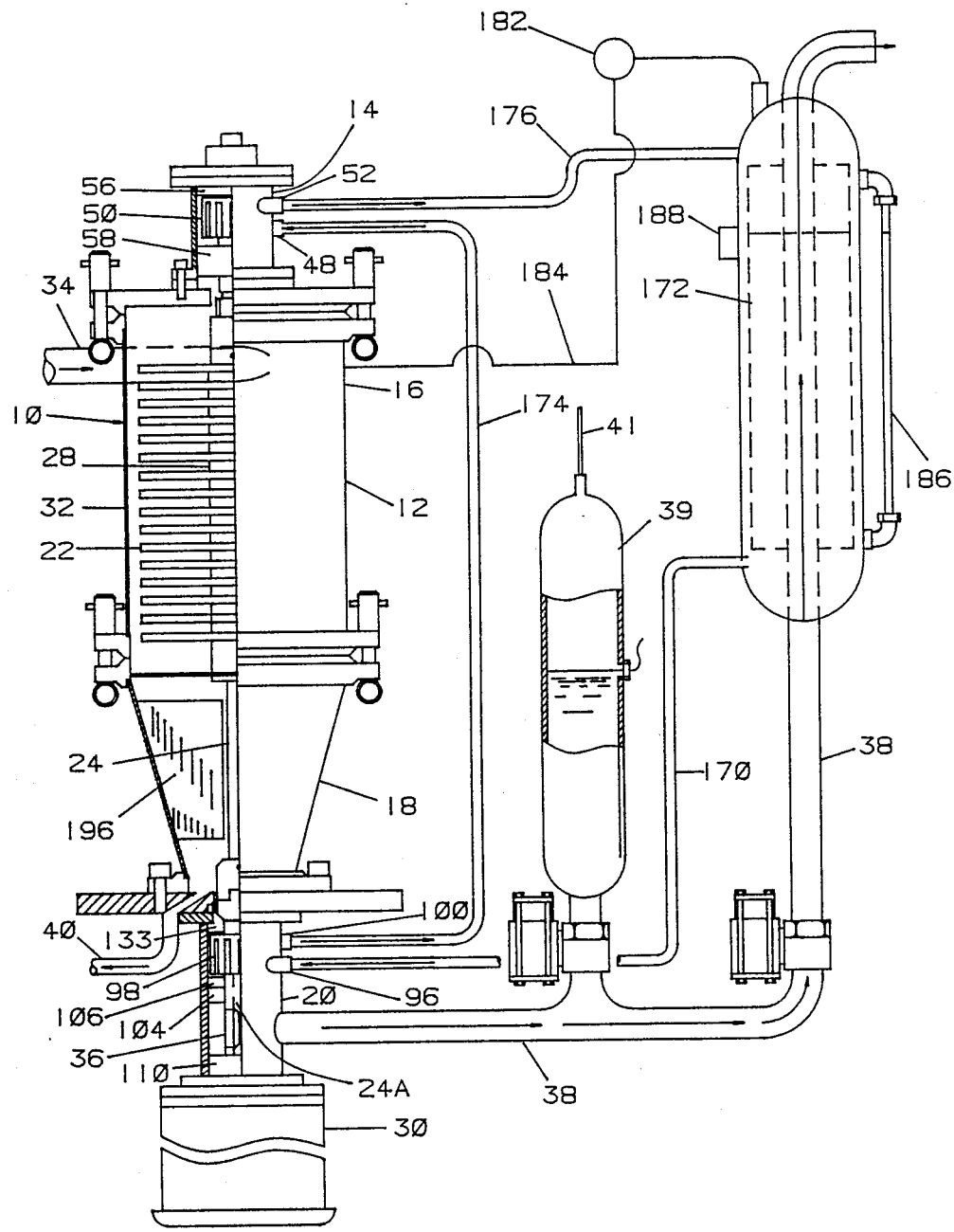
FIG. 1 is a partial cross-sectional view of the centrifugal filter apparatus of the present invention.

With reference to the drawings, the centrifugal filter apparatus of the present invention is shown generally at 10 in FIG. 1 and may be used to separate multiple phases of solids and liquids. The filter apparatus 10 comprises a housing 12 that includes a non-fluid transfer seal assembly 14, a filter barrel 16, a tapered section 18, and a fluid transfer seal assembly 20. A plurality of porous filter disks 22 are mounted upon a hollow, rotatable vertical shaft 24 in spaced stacked relation. The hollow shaft 24 extends through the non-fluid transfer seal assembly 14, the filter barrel assembly 16, the tapered section 18, and the fluid transfer seal assembly 20, and is mounted for rotation at the non-fluid transfer and fluid transfer seal assemblies 14 and 20 so that the disks 22 are capable of rotation within the filter barrel 16. The portion of the hollow shaft 24 extending through the filter barrel 16 has a plurality of openings 26 to the hollow bore of the shaft 24, the openings 26 being in an even pattern around the circumference of the shaft 24. The disks 22 are spaced by annular spacers 28 located between the disks 22 and the spacers 28 are fluid impervious. A motor 30 is attached to a hollow shaft 24A which is coupled to the shaft 24 so that when energized, the motor 30 causes rotation of the shaft 24 and the disks 22.

Unfiltered fluid, or slurry, consisting of at least one fluid phase is introduced under pressure into a pressure vessel or chamber 32 formed on the interior of the filter barrel 16. The unfiltered fluid is introduced through an entry port 34, which is a tangential port designed to cause the entering fluid to be in the same direction as rotation of the hollow shaft 24. The pressure forces clarified fluid through the disks 22 to form a filtrate and the fluid phase with solid particulates is propelled outward by centrifugal forces. The filtrate flows down the hollow shafts 24 and 24A, through an exit port 36 located near the end of the shaft 24A in the fluid transfer seal assembly 20 and then exits the filter apparatus at a pipe 38. An accumulator 39 is connected on the pipe 38 which allows the system to be back-pulsed by actuating an air inlet 41 in the accumulator 39. Such back-pulsing acts to clean the disks 22 when the disks are partially clogged. The accumulator 39 also acts to maximize desirable backpulse surges. The remaining unfiltered fluid and particulates circulate and descend downward in the filter barrel 16 and settle in the tapered section 18 to form concentratd slurry or sludge, which exits the centrifugal filter apparatus 10 at a pipe 40.

The shaft 24 is supported at one end at the non-fluid transfer seal assembly 14 and the shaft 24A is supported at the other end by the fluid transfer seal assembly 20. The seal assemblies 14 and 20, described below, comprise bearings, seals, and associated parts upon which the shaft is properly aligned, balanced, and centered.

Figure 2:
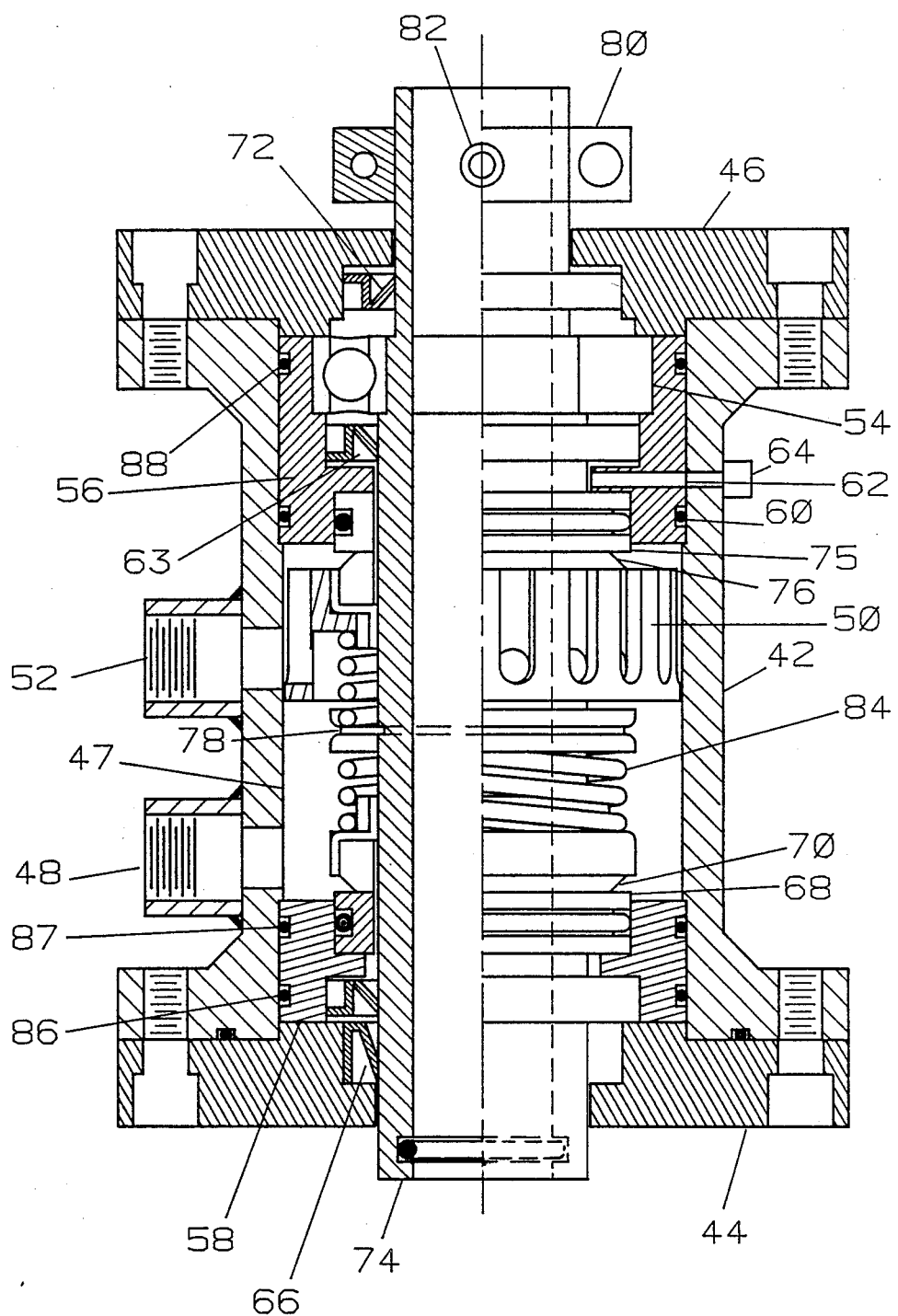
FIG. 2 is a vertical cross-sectional view of the non-fluid transfer seal assembly of the present invention.

As shown in FIG. 2, the non-fluid transfer seal assembly 14 is non-fluid transmitting and comprises a seal body 42 bounded by an inboard cover 44 and an outboard cover 46. A coolant enters an open area 47 within the non-fluid transfer seal assembly 14 at a seal coolant inlet 48 and is pumped through the non-fluid transfer seal assembly 14 by a turbine 50 and exits at a seal coolant outlet 52. The seal body 42 has a bearing 54 within a bearing carrier 56 and a seal carrier 58 which provides an easy mechanism for self-alignment and venting of the coolant. The bearing 54 is preferably a single row, deep groove ball bearing which provides radial, axial, and fulcrum point support for the shaft 24 alignment. The venting of the coolant which bypasses a sealing O-ring 60 or a seal 75 at a vent 62 permits fluids to escape the seal body 42 without damage resulting to the bearing 54 and provides an early warning of imminent failure of the seal 75 and a seal 76. Upon failure of the seals 75 and/or 76, a lip seal 63 provides an interface against which coolant is directed into the vent 62. A fluid sensing probe 64 may be attached at the location of the vent 62 to provide remote monitoring of seal failure. An inboard lip seal 66 prevents large particulate matter of the unfiltered fluid from entering into the area near an inboard stationary mechanical seal 68 and an inboard rotary mechanical seal 70. The seals 68 and 70 provide a seal of the coolant from the unfiltered fluid contained in the chamber 32; an outboard stationary mechanical seal 75 and an inboard rotary mechanical seal provide a seal of the coolant from the bearing 54 and the atmosphere. An outboard lip seal 72 prevents outside contamination of either particulate or fluid nature from entering the bearing 54.

A rotary sleeve 74 is the support and drive mechanism for all of the rotating components of the non-fluid transfer seal assembly 14 and permits the non-fluid transfer seal assembly 14 to be slid over the end of the shaft 24 during assembly. The inboard rotary mechanical seal 70 and the outboard rotary mechanical seal 76 both simply slide over the rotary sleeve 74 with a rubber bladder (not shown) providing the necessary friction drive. The rotary sleeve 74 provides a drive mechanism for the seals, a drive mechanism for the turbine 50, a seal to the atmosphere, self-alignment, and support for the idler end of the rotating shaft 24. A snap ring 78 provides longitudinal spacing of the rotary sleeve 74. The rotary sleeve 74 is fastened to the shaft 24 by means of a collar 80 and set screws 82. The collar 80 thus provides torque transmission from the shaft 24 to the rotary sleeve 74.

The turbine 50 provides the pumping of the seal coolant and is attached to the outboard rotary mechanical seal 76. The turbine 50 can be manufactured from a variety of plastic, metallic, and ceramic materials which have suitable strength and temperature expansion coefficients. The seal coolant inlet 48 and outlet 52 are preferably tangentially positioned to improve the pumping characteristics of the turbine 50. The clean coolant fluid is supplied under a pressure slightly greater than the pressure of the unfiltered fluid introduced into the chamber 32 and provides a clean lubricant to flood the faces of the seals 68, 70, 75 and 76. This prevents or minimizes the possibility of liquid containing particulates or dissolved minerals from entering between these faces. Continual cooling along with relatively mineral free coolant extends the seal life with minimal maintenance. In addition to the pressure of the seal coolant, pressure against the seal 68, 70, 75, and 76 is also augmented by use of a spring 84 which is coiled about the shaft 24 between seals 70 and 76.

The mechanical seals may be made of different materials depending upon the nature of the fluid(s) and the solid particulate. Typical materials for the mechanical seals include carbon-ceramic and tungsten carbide-silica carbide with the latter being more resistant to abrasive materials. The other parts of the non-fluid transfer seal assembly 14 may be fabricated from almost any strong machinable metal or plastic composite. The sealing O-ring 60 and sealing O-rings 86, 87, and 88 in the non-fluid transfer seal assembly 14 provide harmonic damping, a coolant seal, a containment seal, slight flexing required to provide perfect alignment of the components in order to minimize wear in the assembly, and for ease of assembly.

Figure 3:
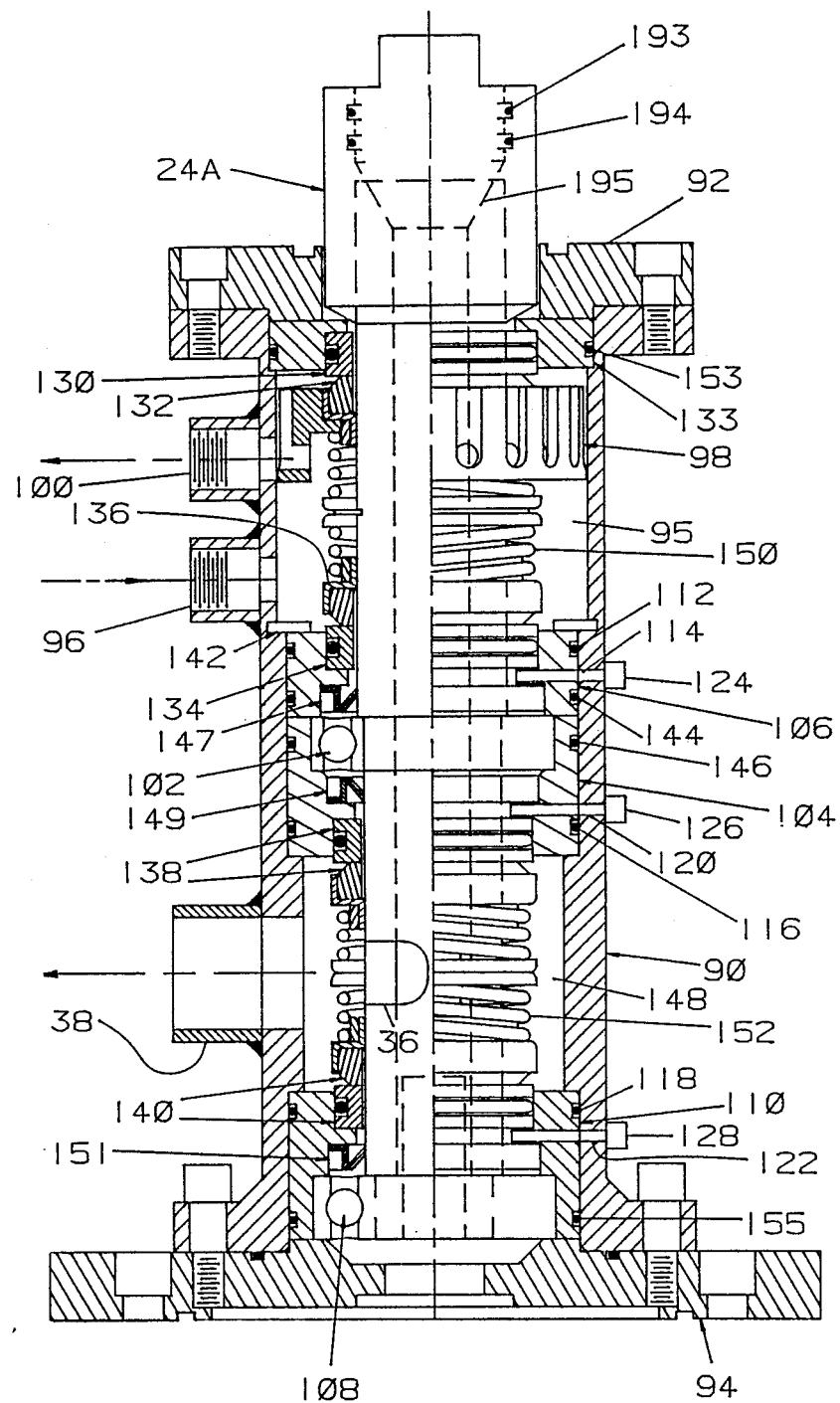
FIG. 3 is a vertical cross-sectional view of the fluid transfer seal assembly of the present invention.
Figure 4:
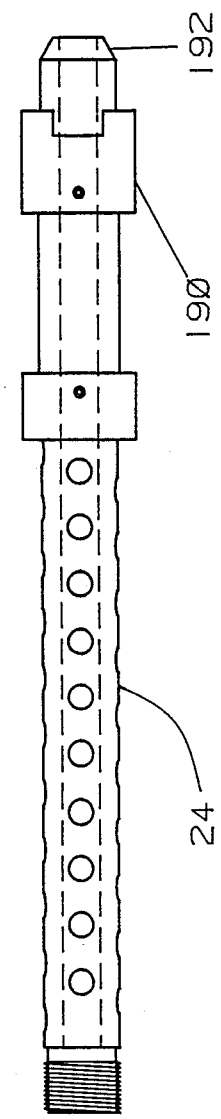
FIG. 4 is a side view of the female portion of the coupling of the present invention attached to the drive shaft of the present invention.
Figure 6:
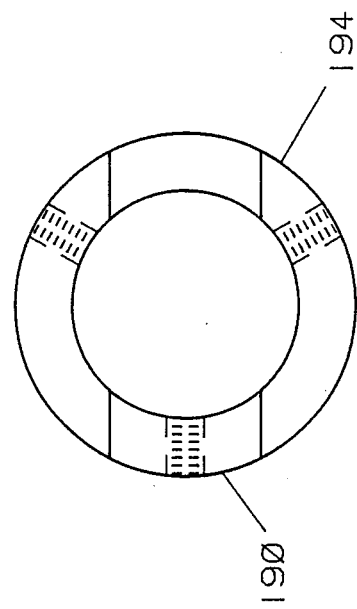
FIG. 6 is an end view of the female coupling.
Figure 5:
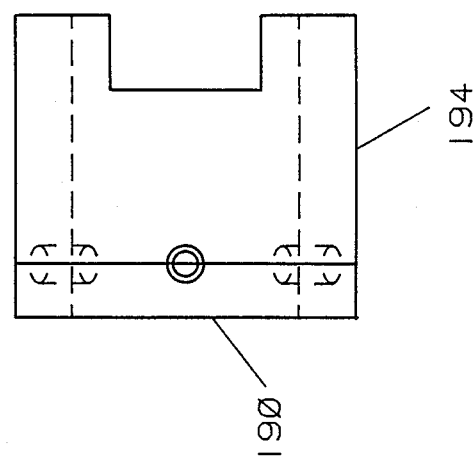
FIG. 5 is a side view of the female coupling of the present invention.
Figure 7:
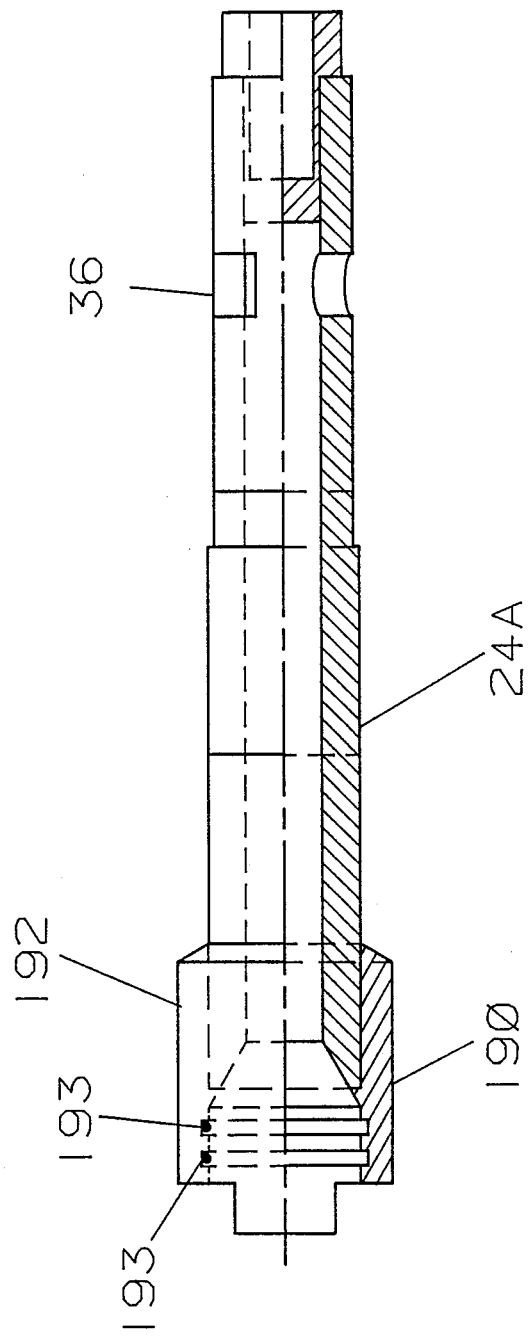
FIG. 7 is a vertical cross-sectional view of the male coupling attached to the drive shaft of the fluid transmitting seal assembly.

The fluid transfer seal assembly 20 as depicted in FIG. 3 is fluid transmitting and has many of the same general components as the non-fluid transfer seal assembly 14 but is able to transmit a filtrate through the rotating shaft 24A at the exit port 36. A seal body 90 represents the main structural component for transmitting torque and for supporting the drive motor 30. The seal body 90 is bounded by an inboard cover 92 and an outboard cover 94. Coolant enters an open area 95 within the fluid transfer seal assembly 20 at a seal coolant inlet 96 and is pumped through the fluid transfer seal assembly 20 by a turbine 98 and exits at a seal coolant outlet 100. The seal body 90 has an inboard bearing 102 within an inboard carrier 104 and an inboard seal carrier 106, and an outboard bearing 108 within a bearing carrier 110, which again provide an easy mechanism for a self-alignment and venting of coolant and/or filtrate which has bypassed one or more seals. The bearings 102 and 108 are preferably single row, deep groove ball bearings which provide radial and axial support for shaft alignment. The venting of the coolant which bypasses a sealing O-ring 112 or a seal 134 at a vent 114 permits coolant to escape the seal body 90 without damage resulting to the inboard bearing 102 and provides an early warning of imminent failure of the seal 134 and/or a seal 136. Upon failure of the seals 134 and/or 136, a lip seal 147 provides an interface against which coolant is directed into the vent 114. The venting of the filtrate which bypasses a sealing O-ring 116 or a seal 138 at a vent 120 permits filtrate to escape the seal body 90 without damage to the inboard bearing 102 and provides an early warning of imminent failure of the seal 138. Upon failure of the seal 138, a lip seal 149 provides an interface against which filtrate is directed into the vent 120. The venting of the filtrate which bypasses a sealing O-ring 118 or a seal 140 at a vent 122 permits filtrate to escape the seal body 90 without damage to the outboard bearing 108 and provides an early warning of imminent failure of the seal 140. Upon failure of the seal 140, a lip seal 151 provides an interface against which filtrate is directed into the vent 122. Fluid sensing probes 124, 126, and 128 are attached at the location of the vents 114, 120, and 122, respectively, to provide remote monitoring of seal failure. The inboard end of the fluid transfer seal assembly 20 resembles the non-fluid transfer seal assembly 14 counterpart with the double mechanical seals 130, 132, 134, and 136 to prevent the unfiltered fluid from entering the inboard bearing 102 or passing to the filtrate. The seal 130 is held in a seal carrier 133. Below the inboard bearing 102, a second set of mechanical seals at 138 and 140 are present to prevent the filtrate from getting to either the inboard or outboard support bearings 102 and 108 and to atmosphere. A snap ring 142 is required to hold the inboard bearing carrier 104 and seal carrier 106. The drive shaft 24A can be removed from the inboard side after removal of the inboard cover 92. The separation of the bearings 102 and 108 provides for reduced bearing loading and more stable drive shaft 24A alignment. The sealing O-rings 112 and 116, and sealing O-rings 144 and 146 are necessary to prevent fluid from passing from the seal coolant to the filtrate. The filtrate leaves the hollow shaft 24A through the exit port 36, then enters an open areas 148, and then leaves the housing via the pipe 38. The outboard cover 94 permits the change of motor frame size by simply changing the cover configuration.

The turbine 98 provides the pumping of the seal coolant in the fluid transfer seal assembly 20. The seal coolant inlet 96 and the seal coolant outlet 100 are preferably tangentially positioned to improve the pumping characteristics of the turbine 98. The clean coolant fluid is supplied under a pressure slightly greater than the pressure of the unfiltered fluid introduced into the chamber 32 and provides a clean lubricant to flood the faces of seals 130, 132, 134, and 136. This prevents or minimizes the possibility of liquid containing particulates or dissolved minerals from entering between these faces. In addition to the pressure of the seal coolant, pressure against the seals 130, 132, 134, and 136 is also augmented by use of a spring 150 which is coiled about the shaft 24A between seals 132 and 136. A spring 152 is also coiled about the shaft 24A between the seals 138 and 140 in the open area 148 to prevent contamination of the filtrate. As in the case of the non-fluid transfer seal assembly 14, the seals and the turbine 98 may be composed of different materials depending upon the application of the filter apparatus 10.

The sealing O-rings 112, 116, 118, 144, 146, and sealing O-rings 153 and 155 in the fluid transfer seal assembly 20 provide harmonic damping, a coolant seal, a containment seal, shift flexing required to provide perfect alignment of the components in order to minimize wear in the assembly, and for ease of assembly.

Figure 13:
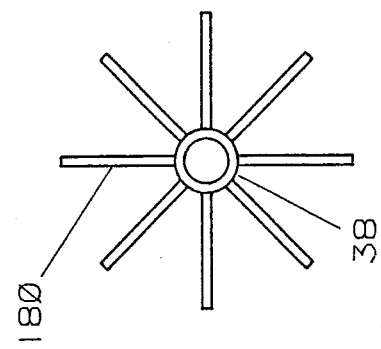
FIG. 13 is an end view of the fin pipe in the seal heat exchanger.
Figure 12:
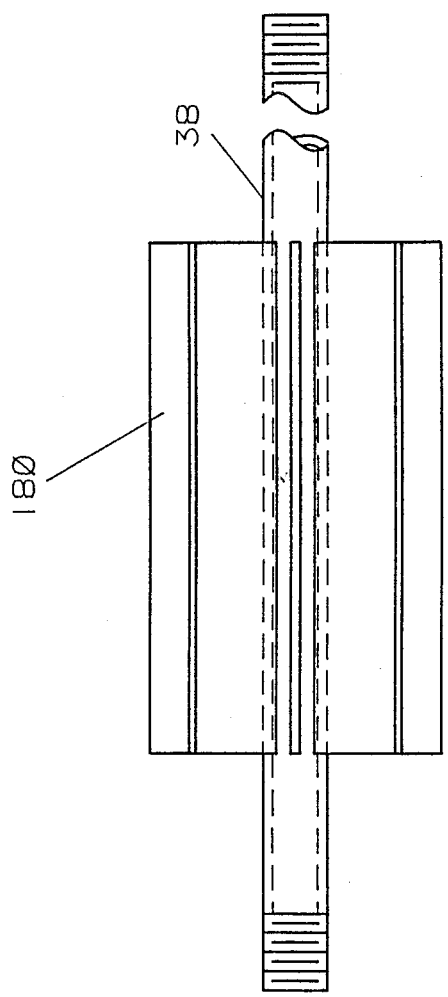
FIG. 12 is a side view of the fin pipe in the seal heat exchanger.

The seal coolant system is best depicted in FIG. 1. Seal coolant is directed through a pipe 170 to the seal coolant inlet 96 in the fluid transfer seal assembly 20 from a heat exchanger 172. The seal coolant is pumped via the turbine 98 and flows through the fluid transfer seal assembly 20 in the open area 95 within the seal body 90 between the seals 132 and 136 and around the shaft 24A. The coolant then is discharged through the seal coolant outlet 100 and is routed through a pipe 174 to the seal coolant inlet 48 to provide a coolant supply to the non-fluid transfer seal assembly 14. The seal coolant is pumped via the turbine 50 and flows through the non-fluid transfer seal assembly 20 in the open area 47 within the seal body 42 between the seals 70 and 76 and around the shaft 74. Warm coolant is then returned to the heat exchanger 172 through a pipe 176 to form a complete loop. The temperature of the seal coolant must be kept significantly below the boiling temperature of the coolant in order to prevent cavitation of either the turbines 50 and 98 resulting in loss of flow rate to the seals and more drastic loss of heat transfer. When the filtrate temperature is low enough, as is depicted in FIG. 1, the filtrate as is carried in the pipe 38 may be utilized to remove the excess heat through a counter current heat exchange. Cooling may, however, be accomplished by a number of other methods, such as use of slurry to remove the excess heat or by other means which may require additional energy consumption or water usage. The heat exchanger 172 is an expansion chamber that can be used as a coolant expansion reservoir. As shown in FIGS. 12 and 13, fins 180 are incorporated to the pipe 38 at the point where the pipe 38 is routed through the heat exchanger 172 to increase exchange efficiency. When filtrate temperatures are too high to be utilized as a means of removing excess heat, radiators with fans or other coolant sources may be substituted for the heat exchanger 172.

As has been previously noted, the pressure of the coolant should be maintained slightly above that of the pressure of the fluid in the chamber 32 to prevent transfer of unfiltered or contaminated fluids across the seal faces at any time. This is accomplished using a feedback bias regulator 182 to supply pressure to the seal system. A feedback line 184 is attached to the chamber 32 and the bias spring adjusted so as to maintain a differential of 0.01–20 psig, preferably 2–5 psig in the seal system above the pressure of the fluid in the chamber 32. Larger differentials are possible but the extra drag results in higher horsepower requirements with little if any gain in seal quality. Seal life may even be shortened by the increased friction. Due to the cyclic nature of filter pressure, a restriction in the feedback line 184 can prevent excessive pressure losses during a back pulse procedure when the vessel pressure drops to near 0 psig, explained below. The heat exchanger has a sight glass 186 for viewing the coolant level and a level sensor 188 for remote sensing and system input. The pipe 38 carrying filtrate passes through the heat exchanger 172 and permits no contact of the filtrate with the coolant. The coolant is typically water for most applications of aqueous filtration but can be any fluid which provides some lubricating qualities and has a high boiling temperature to prevent flashing in the seals and is compatible with the filtrate or process. The high temperature oils of various types, either mineral or vegetable, may be suitable.

FIGS. 4, 5, 6, and 7 show the shafts 24 and 24A with a drive coupling 190 and 194, respectively, near one end of each of the shafts. The coupling 190 and 194 functions as the mechanism for the alignment of the shaft 24 at the one end, transmits the power from the seal shaft, seals the slurry in the chamber 32 from the filtrate, and permits easy assembly and disassembly of the shaft 24 from the unit for replacement of the disks 22. The coupling 190 and 194 of the present invention utilize a male 194 and female 190 interlock, respectively, to effect the power transfer, having a tapered self-aligning male end 192 on the shaft 24 which is inserted into a tapered female socket 195 with preferably slightly greater angle to promote centering. The coupling 190 can be attached to the shaft by a number of different mechanisms, such as welding, set screws, pins, or press-heat fit. The preferred method is heat fit since no additional uneven stresses are placed on the drive shaft 24 and the seal is usually suitable for most applications. The prior art used a threaded connection which required locking of the seal shaft 24A to effect unthreading. The threads had a tendency to gall, were difficult to engage, became filled with debris, and were unwieldy for larger units. Sealing O-rings 193 mounted in coupling 194 above taper 195 provide a seal from slurry entering the filtrate in the shaft 24A.

Figure 9:
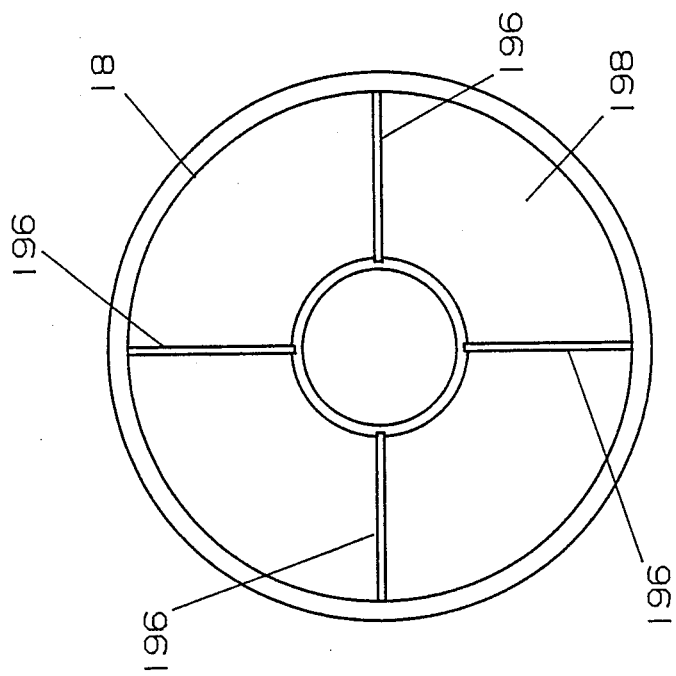
FIG. 9 is a horizontal cross-sectional view of the conical section taken along with line 8—8.
Figure 8:
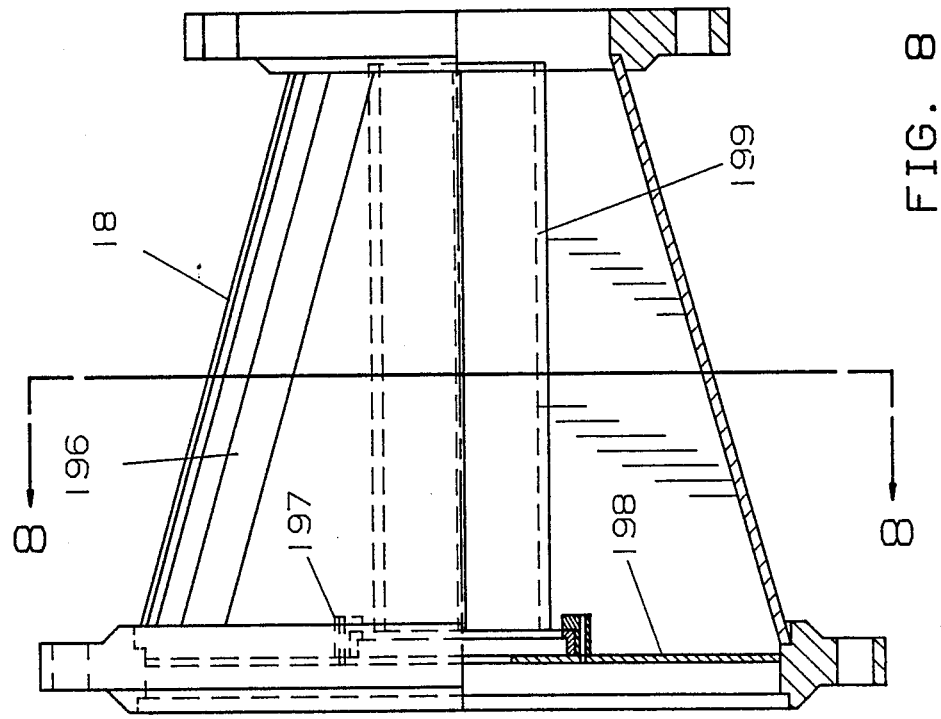
FIG. 8 is a vertical cross-sectional view of the conical section showing baffle shape and positions.
Figure 10:
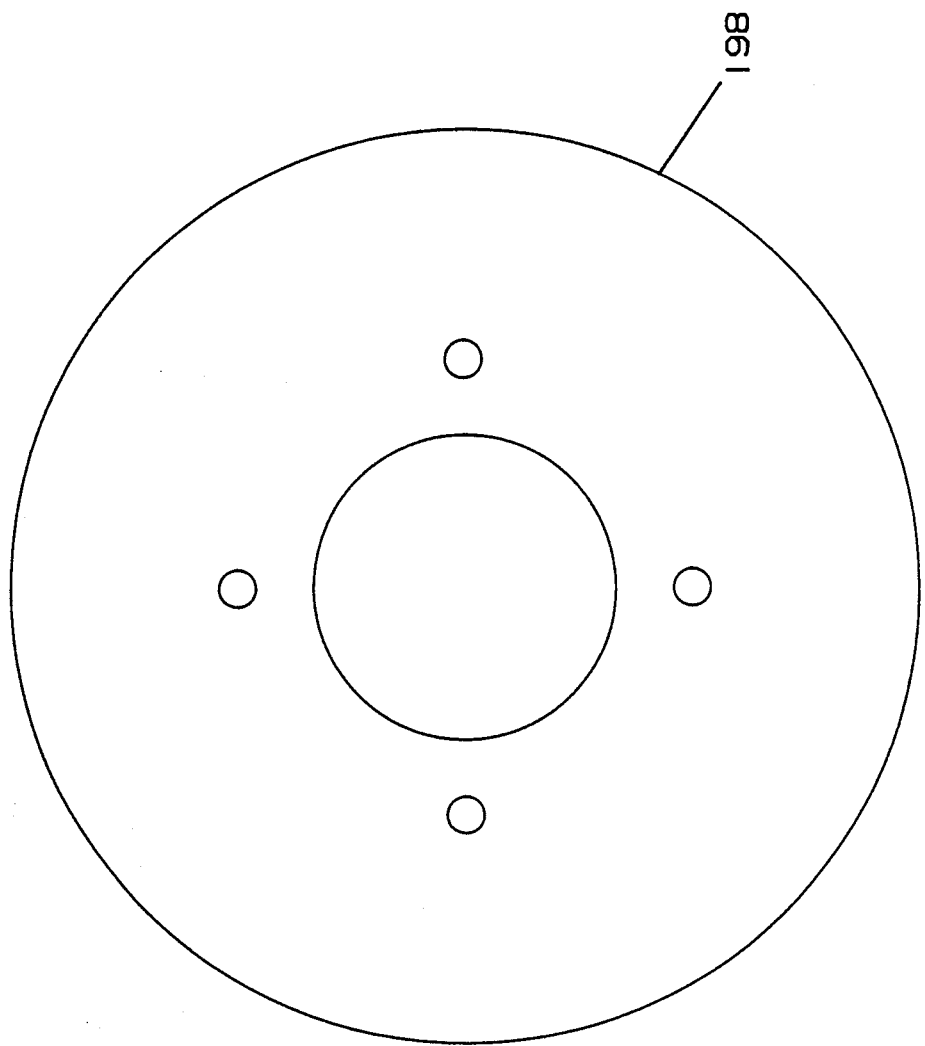
FIG. 10 is a top view of a baffle section.
Figure 11:
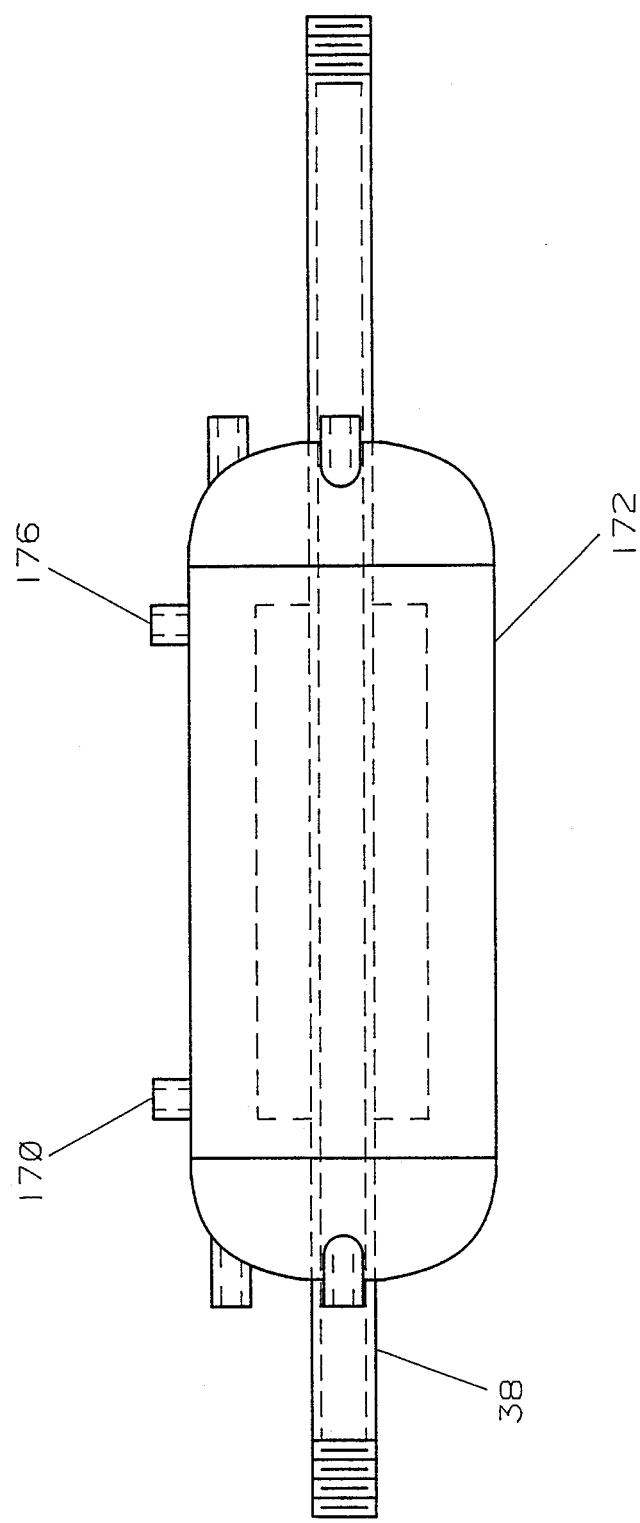
FIG. 11 is a vertical cross-sectional view of the seal heat exchanger tank.

The rotation of the disks 22 creates a vortex action about the disks 22 that tends to maintain the particulate in suspension, rather than allowing settling of the particulates in the tapered section 18 where it may exit concentrated slurry or as sludge at the pipe 40. The vortex action causes fluid to fall down the inner column of the vortex and then climb the wall of the tapered section 18, carrying with it the heavier particulates back into the filter barrel 16 section of the filter apparatus 10. To minimize the vortex action, baffles 196 are attached to the tapered section 18 in a vertical and radial orientation, which then allows for rapid settling of the solids. This is depicted in FIGS. 8, 9, and 10. A horizontal baffle 198 is also utilized in coordination with the radial baffles 196. A sleeve 199 prevents turbulence from the shaft 24 being transmitted to fluid in the tapered section 18. A lip seal 197 prevents vortex flow in the chamber 32 from following down the shaft 24.

It is recognized that the above invention, particularly the sealing arrangement, is applicable to many other types of rotating equipment requiring pressure sealing in adverse fluids and abrasive environments. It is understood that the invention is not confined to the particular construction and arrangement of parts herein illustrated and described, but embraces such modified forms thereof as come within the scope of the following claims.

What is claimed is:

1. A filter apparatus for separating multiple phases of solids or fluids with at least one fluid, comprising:
   (a) a housing having an interior chamber, the interior chamber having an entry port for the introduction, under pressure, of an unfiltered fluid with at least one fluid phase with or without a solid phase into the interior chamber, and an exit port, the exit port used for the discharge of liquid filtrate that has been separated from a second fluid phase or a solid phase;
   (b) a hollow, rotatable vertical shaft located within the chamber having two ends, the shaft having openings in pre-selected regions along the length of the shaft and the shaft being impervious to fluid in other regions along its length;
   (c) a plurality of stacked porous disks surrounding the shaft and connected to the shaft in the pre-selected regions;
   (d) means for removing the collected filter solids or the second phase of the fluid from the chamber;
   (e) means for rotating the shaft at a sufficient speed to prevent solid particle accumulation on at least a substantial portion of the surfaces of the stacked disks;

(f) bearings located at both ends of the shaft to support the shaft on rotation;

(g) seals positioned about the shaft to form a boundary that isolates the bearings from the filtrate and the unfiltered fluid; and (h) means for circulating a coolant against the seals on the side of the boundary opposing the filtrate and the unfiltered fluid, the liquid being circulated at a pressure greater than the pressure of the unfiltered fluid and the filtrate.

2. The filter apparatus of claim 1 wherein the coolant is maintained at a temperature significantly below the boiling temperature of the seal coolant.

3. The filter apparatus of claim 1 wherein the coolant is a lubricant.

4. The filter apparatus of claim 1 further including a carrier positioned between the housing and one of the bearings, and a vent located through the housing at the location of the carrier and between the respective bearing and the boundary that isolates that bearing, the vent allowing weeping of the coolant upon failure of the boundary.

5. The filter appartus of claim 4 further including a lip seal positioned between the respective bearing and the vent, the lip seal directing coolant into the vent upon failure of the boundary.

6. The filter apparatus of claim 4 further including a sealing ring positioned between the housing and the carrier.

7. The filter apparatus of claim 4 further comprising a liquid sensing probe attached at the vent.

8. The filter apparatus of claim 1 wherein the coolant is circulated through a loop formed by connective plumbing which includes a heat exchanger and flow within the housing.

9. The filter apparatus of claim 8 wherein the exit port leads to a pipe that carries the filtrate through the heat exchanger to remove heat in the coolant.

10. The filter apparatus of claim 8 further including a bias regulator that monitors the pressure of the fluid in the housing and delivers pressurized gas to the heat exchanger in an amount necessary to maintain pressure in the coolant greater than the pressure of the fluid in the housing.

11. The filter apparatus of claim 10 wherein the pressure differential between the pressure in the coolant and the pressure of the fluid in the housing is between 0.01–20 psig.

12. The filter apparatus of claim 1 further including springs positioned around the shaft to exert pressure against the seals in a direction to at least partially counteract the pressure of the fluid in the housing.

13. The filter apparatus of claim 8 wherein the means for circulating the coolant includes a turbine positioned within the loop.

14. The filter apparatus of claim 13 wherein the turbine is driven by the shaft.

15. The filter apparatus of claim 14 further including a sleeve that fits around the shaft and transfers power from the shaft to the turbine.

16. The filter apparatus of claim 14 wherein there are two turbines, one turbine located at one end of the shaft and the other turbine located at the opposing end.

17. The filter apparatus of claim 1 wherein the housing is shaped to have a tapered bottom section to concentrate the filtered solids or the second phase of the fluid from the chamber.

18. The filter apparatus of claim 17 wherein the tapered bottom section of the housing has a baffle extending radially therefrom into the chamber to minimize turbulence of the concentrated solids or fluid phases caused by the rotating shaft and disks.

19. The filter apparatus of claim 17 wherein the tapered bottom section of the housing has a baffle extending horizontally therefrom into the chamber to minimize turbulence of the concentrated solids or fluid phases caused by the rotating shaft and disks.

20. The filter apparatus of claim 19 wherein the horizontal baffle extends across the tapered section having a centrally located hole and a sleeve extending down from the hole which surrounds the shaft.

21. The filter apparatus of claim 1 wherein the shaft has a coupling at a point along its length to transfer power from the means for rotating the shaft to the shaft, the coupling having a male end which is insertable into a female socket.

22. The filter apparatus of claim 1 wherein one of the bearings and the boundary that isolates that bearing is located within a body that is removable from the filter apparatus.

* * * * *